United States Patent
Hinedi et al.

(12) 
(10) Patent No.: US 6,449,738 B1
(45) Date of Patent: Sep. 10, 2002

(54) APPARATUS FOR BUS FREQUENCY INDEPENDENT WRAP I/O TESTING AND METHOD THEREFOR

(75) Inventors: Fahd Hinedi, Austin; James Nolan Hardage, Jr., Kyle, both of TX (US); Lakshmikant Mamileti, Denver, CO (US)

(73) Assignees: International Business Machines Corporation, Armonk, NY (US); Motorola, Inc, Schaumburg, IL (US)

( * ) Notice: Subject to any disclaimer, the term of this patent is extended or adjusted under 35 U.S.C. 154(b) by 0 days.

(21) Appl. No.: 09/204,923

(22) Filed: Dec. 3, 1998

(51) Int. Cl.[7] .............................................. G01R 31/28
(52) U.S. Cl. ......................... 714/43; 714/744; 714/727
(58) Field of Search ........................... 714/43, 724–745

(56) References Cited

U.S. PATENT DOCUMENTS

| | | | |
|---|---|---|---|
| 4,969,148 A | 11/1990 | Nadeau-Dostie et al. | 371/21.1 |
| 5,095,262 A | 3/1992 | Henley et al. | 324/73.1 |
| 5,181,191 A | 1/1993 | Farwell | 368/113 |
| 5,208,838 A | 5/1993 | Wendell et al. | 375/106 |
| 5,329,533 A | 7/1994 | Lin | 371/22.3 |
| 5,355,369 A | 10/1994 | Greenberger et al. | 371/22.3 |
| 5,381,420 A | 1/1995 | Henry | 371/22.3 |
| 5,577,236 A * | 11/1996 | Johnson et al. | |
| 5,579,350 A * | 11/1996 | Furukawa et al. | |
| 5,640,509 A * | 6/1997 | Balmer et al. | |
| 5,734,685 A * | 3/1998 | Bedell et al. | |
| 5,970,110 A * | 10/1999 | Li | |
| 6,043,677 A * | 3/2000 | Albu et al. | |
| 6,108,795 A * | 8/2000 | Jeddeloh | 713/401 |
| 6,134,182 A * | 10/2000 | Pilo et al. | |
| 6,163,491 A * | 12/2000 | Iwamoto et al. | 365/201 |
| 6,209,075 B1 * | 3/2001 | Lau | 711/171 |

* cited by examiner

*Primary Examiner*—Paul R. Myers
(74) *Attorney, Agent, or Firm*—Winstead Sechrest & Minick P.C.; Barry S. Newberger; Marylin S. Dawkins

(57) ABSTRACT

A bus-clock-speed-independent apparatus and method of wrap input/output (I/O) testing of an I/O interface is provided. Launch data is launched in response to a launch clock. A capture clock is derived from the launch clock by delaying the launch clock through a programmable delay. Launch data is wrapped through the I/O interface buffers and captured in response to the capture clock. A initial value of the programmable delay is selected and successively increased or decreased until the launch data is just captured, or just fails to be captured, respectively. The value of the programmable delay when this occurs provides a measure of the limiting speed of the I/O interface.

12 Claims, 7 Drawing Sheets

APPARATUS FOR BUS FREQUENCY INDEPENDENT WRAP I/O TESTING AND METHOD THEREFOR

TECHNICAL FIELD

The present invention relates in general to a data processing system, and in particular, to high frequency I/O interface testing in a data processing system.

BACKGROUND INFORMATION

The increasing clock speeds in modem processor devices complicates the testing facilities for testing input/output ("I/O") interfaces. FIG. 1A illustrates an I/O interface 100 in accordance with prior art. Both input data and output data are presented on bidirectional data pin 102. Output data is received as launch data input 104 in output launch latch 106. The launch data is latched into latch 106 on an edge of clock 108, and is then provided to an input of buffer 110. An output of output buffer 110 is connected to bidirectional data pin 102. The output of output buffer 110 and bidirectional data pin 102 are coupled to an input of input buffer 112. Input data appearing on bidirectional data pin 102 is buffered by input buffer 112 and provided to input 114 of input capture latch 116. In this way, launch data also appears, albeit delayed in time due to synchronization and propagation delays in the circuitry, at input capture latch 116. Following set-up of the input data on input 114 of input capture latch 116, the data is latched on an edge of clock 108. The wrapping of launch data at input 104 from output launch latch 106 into capture data at output 118 from input capture latch 116 is used to test I/O interface 100.

FIG. 1B schematically illustrates a timing diagram of interface 100 for a first speed of clock 108 having a clock period longer than the propagation delays from output latch 106, through buffer 110, through buffer 112 and into input latch 116. Output data "a" on launch data 104 is latched into output launch latch 106 on the rising edge, T1 of clock 108. Following clock edge T1, the next data "b" is set up on launch data 104, and latched into output launch latch 106 on edge T2 of clock 108, one clock period after edge T1. On the same edge, T2, data "a" is captured in capture input latch 116. Data "a" appears on input 114 of input capture latch 116 following a delay, $T_{delay}$, which includes the propagation delays from output latch 106 through buffers 110 and 112.

In wrap I/O testing in accordance with the prior art, the speed of clock 108 is increased until launch data from output launch latch 106 is no longer captured in the same cycle in input capture latch 116. This occurs when, $T_{delay}$ plus the set-up time, typically non-negative, for input latch 116 exceed the clock period. FIG. 1C schematically illustrates a timing diagram for I/O interface 100 having a propagation delay exceeding the period of clock 108. Data to be launched is set up on launch data 104, and in the embodiment illustrated, is latched on the rising edge of clock 108. Data "a" is launched on clock transition T1, and data "b" is launched on clock transition T2. After a propagation delay from output launch latch 106, the data is wrapped through buffer 110 and buffer 112 to input 114 of input latch 116. The data launched appears at input 114 after a propagation delay, $T_{delay}$. In FIG. 1C, $T_{delay}$ plus the set-up time of input capture latch 116 exceeds the period of clock 108. Therefore, the data, for example data "a" does not arrive at the input 114 of latch 116 in time for the next succeeding positive edge of clock 108, T2. In this case, the data launched in a given cycle, for example, data "a" launched in cycle C0 is not captured in the same cycle, C0. Thus, in wrap I/O testing according to the prior art, the speed of clock 108 is increased until the data launched in a given clock cycle fails to be captured in the same cycle. This determines the limiting speed of I/O interface 100.

Wrap I/O testing in this way requires the tester to operate at the functional speed of I/O interface 100 under test. As the speed of data processing devices is increased, this requirement exceeds the capability of wrap I/O testers. Thus, there is a need in the art for apparatus and methods of testing of I/O interfaces at functional speeds that may exceed and are otherwise independent of the tester bus frequency.

SUMMARY OF THE INVENTION

The aforementioned needs are addressed by the present invention. Accordingly, there is provided, in a first form, an apparatus for wrap input/output (I/O) interface testing including a multiplexer operable for receiving first and second clock signals. The multiplexer is operable for selecting the first clock signal in response to a control signal asserted during I/O interface testing. A programmable delay unit is coupled to an output of the multiplexer. The programmable delay unit outputs a third clock signal operable for capturing an input data signal.

There is also provided, in a second form, a method of wrap I/O interface testing. The method includes the step of selecting a clock delay value, and launching a first data value in response to a first clock signal. The first clock signal is delayed by the clock delay value from the selecting step, thereby generating a second clock signal. A second data value is captured in response to the second clock signal.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
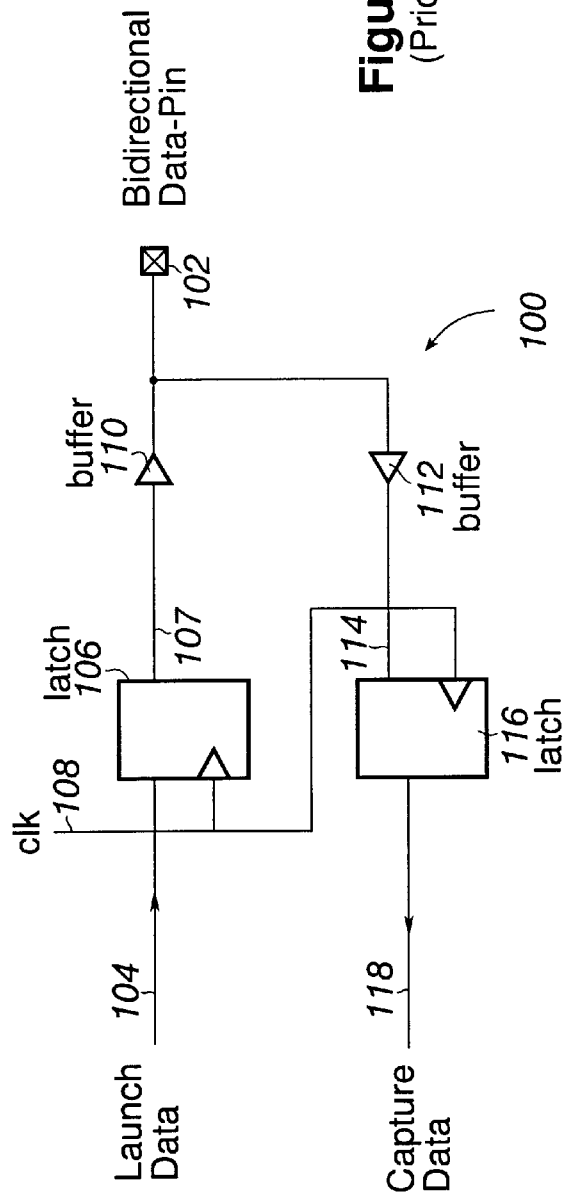
FIG. 1A illustrates, in block diagram form, an I/O interface according to the prior art.
Figure 1B:
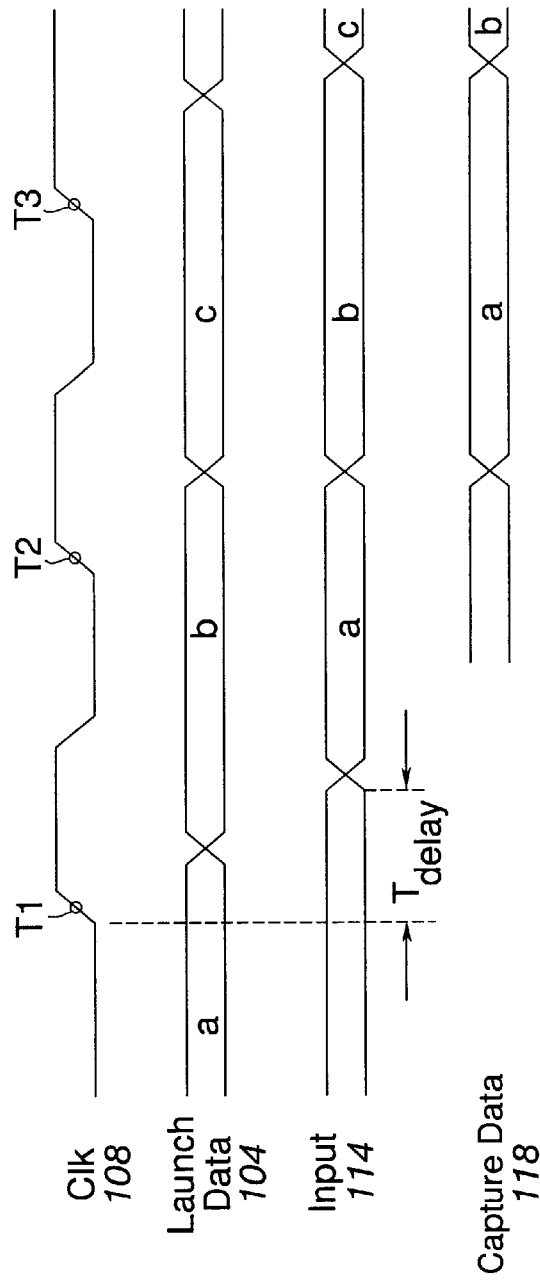
FIG. 1B illustrates a first timing diagram of an I/O interface in accordance with a prior art embodiment of wrap I/O testing.
Figure 1C:
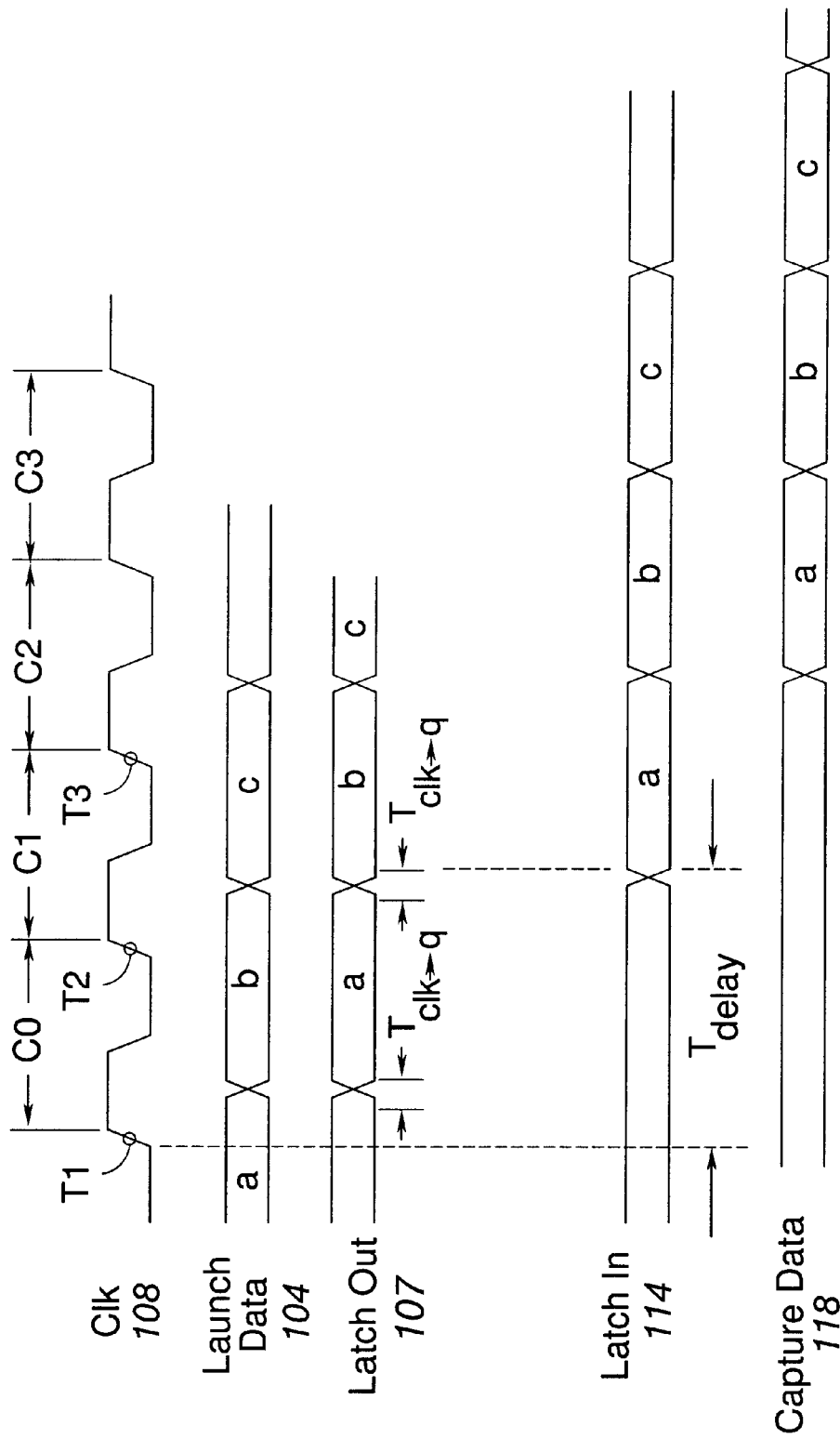
FIG. 1C illustrates a second timing diagram of an I/O interface in accordance with another prior art embodiment of wrap I/O testing.

The present invention provides a wrap I/O testing mechanism that is independent of the bus clock frequency. A launch clock that may run at a frequency substantially lower than the I/O bus frequency is provided to launch data. Data is captured under the control of the capture clock that is derived from the launch clock via a selectable delay. Delays are iteratively selected until the launched data is captured. Alternatively, delays are reduced from an initial value until launch data is no longer captured. The value of the delay time at which capture of the launch data input just occurs, or alternatively, just fails, then provides a limiting period of the I/O bus clock.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

Refer now to the drawings wherein depicted elements are not necessarily shown to scale and wherein like or similar elements are designated by the same reference numeral through the several views.

Figure 2:
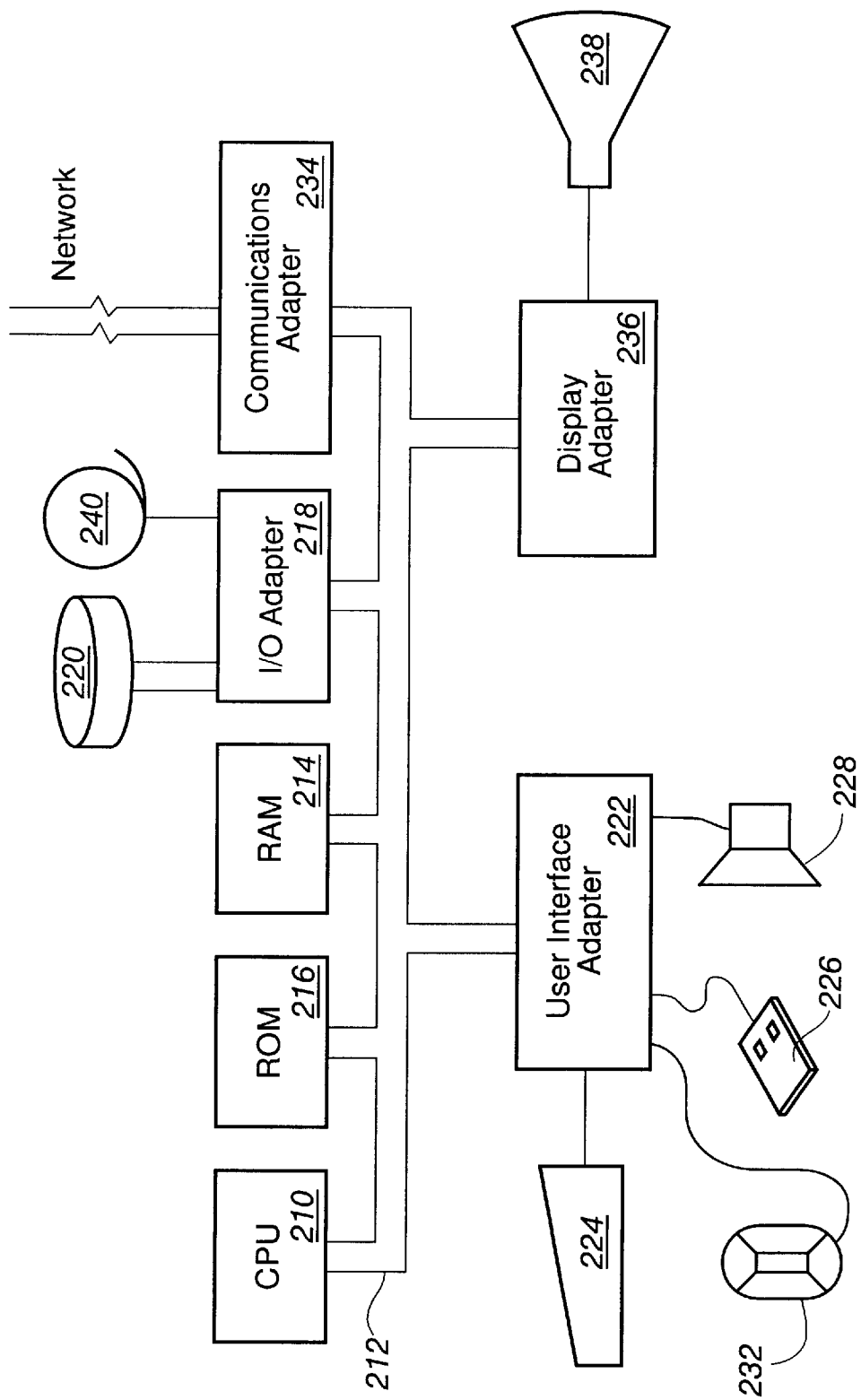
FIG. 2 illustrates, in block diagram form, a data processing system in accordance with an embodiment of the present invention.

A representative hardware environment for practicing the present invention is depicted in FIG. 2, which illustrates a typical hardware configuration of data processing system 213 in accordance with the subject invention having central processing unit (CPU) 210, such as a conventional microprocessor, and a number of other units interconnected via system bus 212. Data processing system 213 includes random access memory (RAM) 214, read only memory (ROM) 216, and input/output (I/O) adapter 218 for connecting peripheral devices such as disk units 220 and tape drives 240 to bus 212, user interface adapter 222 for connecting keyboard 224, mouse 226, and/or other user interface devices such as a touch screen device (not shown) to bus 212, communication adapter 234 for connecting data processing system 213 to a data processing network, and display adapter 236 for connecting bus 212 to display device 238. CPU 210 may include other circuitry not shown herein, which will include circuitry commonly found within a microprocessor, e.g., execution unit, arithmetic logic unit, etc. CPU 210 may also reside on a single integrated circuit.

Figure 3A:
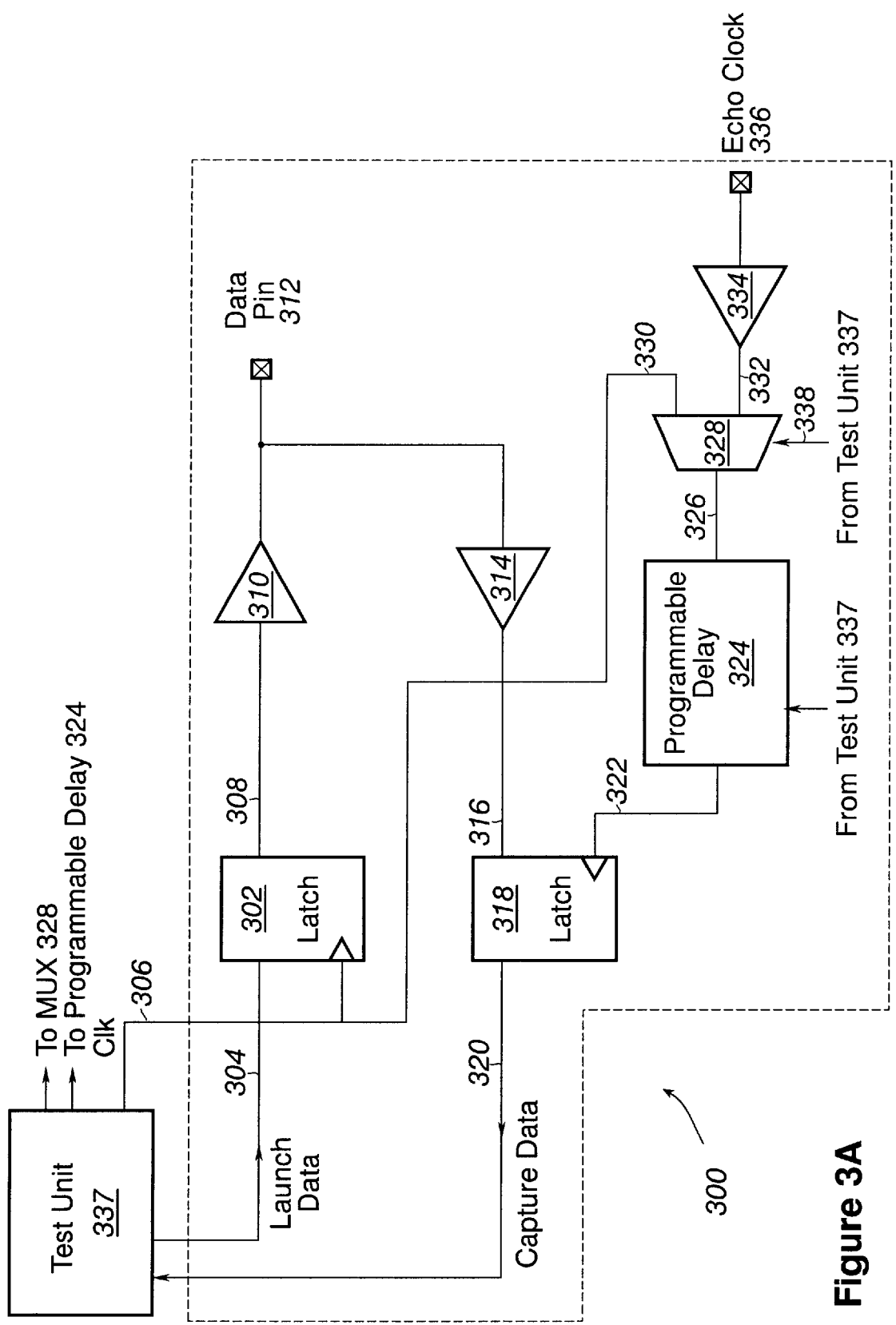
FIG. 3A illustrates, in block diagram form, an I/O interface in accordance with an embodiment of the present invention.

Refer now to FIG. 3A illustrating I/O interface 300 according to an embodiment of the present invention. I/O interface 300 includes output latch 302 which receives launch data on input 304 and clock 306. Output 308 of latch 302 is coupled to output buffer 310 which drives bidirectional data pin 312. Data pin 312 is coupled to an input of input buffer 314, the output of which is coupled to input 316 of input capture latch 318. Capture data appears on output 320 of latch 318. Input latch 318 is clocked by clock signal 322. Clock signal 322 is obtained from programmable delay circuit 324 coupled to output 326 of mux (multiplexer) 328. Mux 328 receives clock 306 on input 330. A second input to mux 328, input 332, is coupled to an output of buffer 334. Buffer 334 receives echo clock 336. In an embodiment of I/O interface 300, echo clock 336 may be provided by system memory, such as RAM 214 in FIG. 2. In an embodiment of RAM 214 constituting a double data rate (DDR) static RAM, RAM 214 provides echo clock 336 to I/O interface 300.

Mux 328 selects for the corresponding clock signal on input 330 and input 332 in response to control signal 338. During wrap I/O test, the test unit 337 asserts a signal on control 338, and mux 328 selects input 330, whereby clock 306 is provided to programmable delay 324 on output 326. Test unit 337 may be a commercial test device such as an HP8300 or Teradyne J971. In normal operation of I/O interface 300, control 338 is negated, and mux 328 selects input 322 in response thereto. Mux 328 then outputs echo clock 336 on output 326, and in an embodiment of RAM 214 providing echo clock 336, data from RAM 214 is latched in response to a delayed echo clock output by programmable delay circuit 324.

Figure 3B:
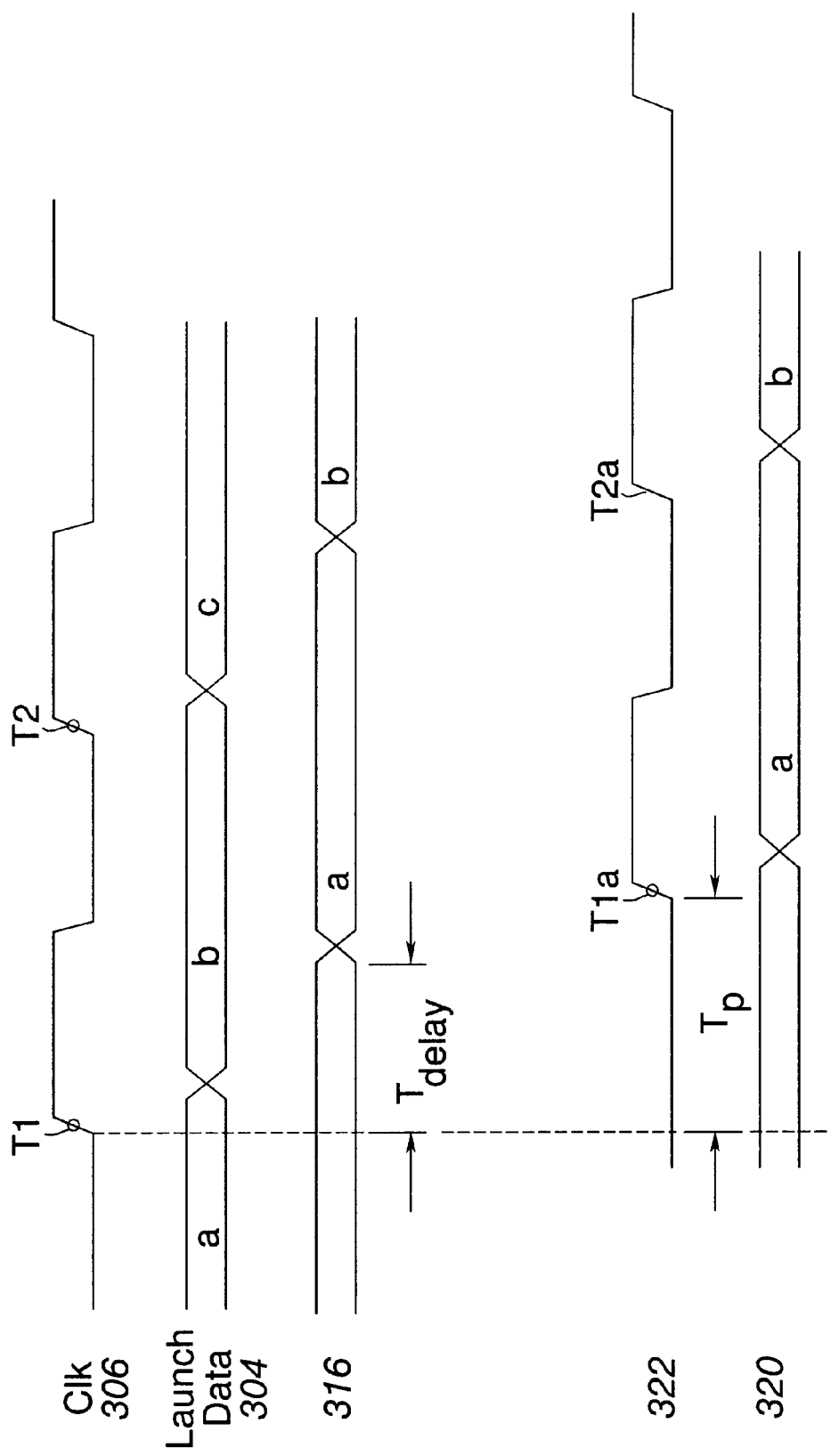
FIG. 3B illustrates a first timing diagram for wrap I/O testing of an I/O interface in accordance with an embodiment of the present invention.
Figure 3C:
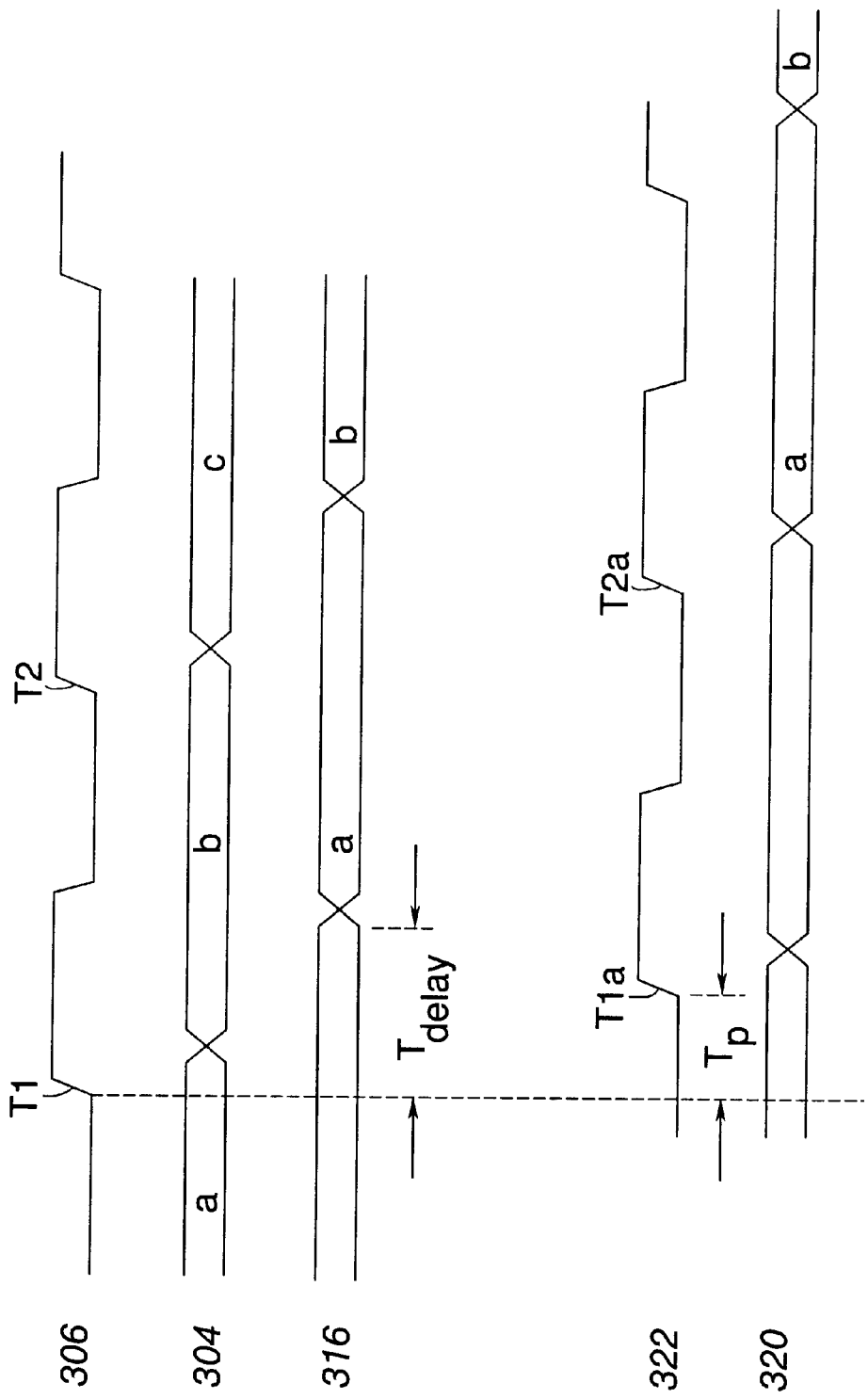
FIG. 3C illustrates a second timing diagram for wrap I/O testing and an I/O interface according to an embodiment of the present invention.

During wrap I/O testing, data is launched in response to launch clock 306 and captured in response to capture clock 322. FIGS. 3B and 3C schematically illustrate timing diagrams for I/O interface 300 during wrap I/O test in which the delay, $T_p$, between capture clock 322 and launch clock 306 is, respectively, larger than, and smaller than, $T_{delay}$. Referring first to FIG. 3B, data "a" on launch data input 304 is launched from output launch latch 302 on the positive going transition, T1 of launch clock 306. Data "a" appears at input 316 of latch 318, delayed by propagation delays from latch 302, and through buffers 310 and 314, as previously described. Launch clock 306 is provided to programmable delay 324 from the output of mux 326, whereby capture clock 322 is asserted at latch 318 after the programmable time delay $T_p$. In FIG. 3B, $T_p$ is greater than the total propagation delay, $T_{delay}$, and data "a" is captured on output data 320 on the positive edge T1a of capture clock 322. Conversely, referring now to FIG. 3C, if $T_p$ is less than $T_{delay}$, then data value "a" will not be captured on the positive edge T1a of capture clock 322 and does not appear as capture data on output 320. Thus, the limiting speed of I/O interface 300 may be determined during wrap I/O test by selectably increasing the delay generated by programmable delay 324 from a suitably small value, understood to be approximately zero, and increasing the delay $T_p$ until the data launched on data launch 304 appears on capture data 320 captured by transition T1a. The delay $T_p$ at which the launch data is first captured provides a measure of the operating speed of I/O interface 300. Alternatively, the initial value of the delay, $T_p$, may be selected such that data "a" is captured at the transition T1a. Then, $T_p$ is successively decreased until "a" just ceases to be captured at transition T1a and is instead captured at T2a. Measurement of the speed of I/O interface 300 is independent of the period of launch clock 306.

Figure 4:
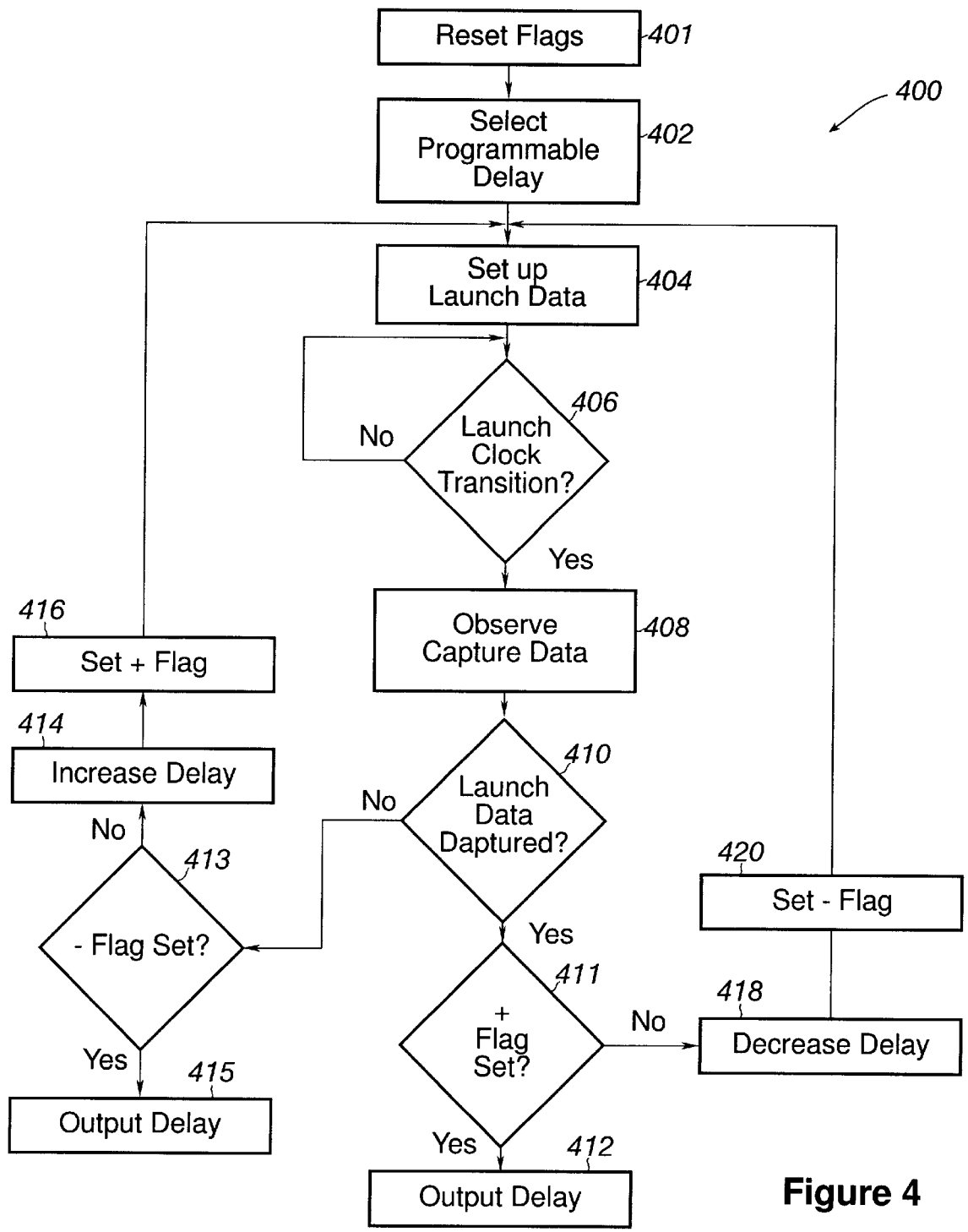
FIG. 4 illustrates, in flowchart form, a method of wrap I/O testing in accordance with an embodiment of the present invention.

The operation of I/O interface 300 during wrap I/O test may be further understood by referring now to FIG. 4 in which is illustrated a flowchart of wrap I/O test method 400 according to the present invention. Method 400 may be performed by test unit 337, an embodiment of which may be a Hewlett-Packard HP8300 or Teradyne J971 test unit, in conjunction with I/O interface 300. In step 401, a pair of flags, $F^+$ and $F^-$ are reset. In step 402, an initial programmable delay is selected, and, in step 404 the launch data is set up on launch data 304. Method 400 waits, in step 406, until launch clock 306 transitions launching the data set up in step 404.

Output 320 is observed in step 408. If, in step 410, the launch data is detected on output 320, the $F^+$ flag is tested in step 411. If $F^+$ is set, the programmed delay time, $T_p$, is output in step 412. Otherwise, method 400 continues by decreasing the delay in step 418, setting flag $F^-$ in step 420, and returning to step 404. Method 400 loops through steps 404, 406, 408, 410, 411, 418 and 420 until launch data fails to be detected in step 410. In step 413, $F^-$ is tested, and, having been set in step 420, $T_p$ is output in step 415.

If initially, in step 410, the launch data was not captured, flag $F^-$ is tested in step 413. Because $F^-$ has not been set, the delay, $T_p$ is increased in step 414 and F⁺ is set in step 416. Method 400 returns to step 404 and loops through steps 404, 406, 408, 410, 413, 414 and 416 until launch data is detected in step 410. F⁺ is tested in step 411 and, because F⁺ has been set in step 416, programmable delay $T_p$ is output in step 412.

Although the present invention and its advantages have been described in detail, it should be understood that various changes, substitutions and alterations can be made herein without departing from the spirit and scope of the invention as defined by the appended claims.

What is claimed is:

1. A method of wrap input/output (I/O) interface testing comprising the steps of:
    selecting a clock delay value;
    launching a first data value in response to a first clock signal;
    delaying said first clock signal by said delay value to generate a second clock signal;
    capturing a second data value in response to the second clock signal; and
    if said second data value is not the said first data value:
       increasing said clock delay value; and
       repeating the steps of launching, delaying. capturing and increasing.

2. A method of wrap input/output (I/O) interface testing comprising the steps of:
    selecting a clock delay value;
    launching a first data value in response to a first clock signal;
    delaying said fist clock signal by said delay value to generate a second clock signal;
    capturing a second data value in response to the second clock signal; and
    if said second data value is said first data value:
       decreasing the clock value; and
       repeating the steps of launching, delaying, capturing and decreasing.

3. The method of claim 1 further comprising the step of, when said second data value is said first data value, outputting said clock delay value.

4. The method of claim 2 further comprising the step of, when said second data value is not said first data value, outputting said clock delay value.

5. An apparatus for wrap input/output (I/O) interface testing comprising:
    a test unit;
    a first latch operable for storing a first data value, wherein a first data signal having the data value is launched in response to a first clock;
    a second latch operable for capturing a second data signal in response to a second clock; and
    a programmable delay unit coupled to the test unit, wherein the test unit is operable for setting a delay value of the programmable delay, wherein the delay unit outputs the second clock and wherein the test unit is operable for sequentially increasing the delay value if a value of the second data signal does no t correspond to the first data value.

6. The apparatus of claim 5 further comprising a first buffer an input operable for receiving said first data signal; and
    a second buffer having an input coupled to an output of the first buffer and an output for outputting the second data signal, wherein the output of the second buffer is coupled to an input of the first buffer.

7. The apparatus of claim 5 wherein the first clock is provided by the test unit.

8. The apparatus of claim 5 wherein the apparatus outputs the second data signal when the value of the second data signal corresponds to the first data value.

9. An apparatus for wrap input/output (I/O) interface testing comprising:
    a test unit;
    a first latch operable for storing a first data value, wherein a first data signal having the first data value is launched in response to a first clock;
    a second latch operable for capturing a second data signal in response to a second clock; and
    a programmable delay unit coupled to the test unit, wherein the test unit is operable for setting a delay value of the programmable delay, wherein the delay unit outputs the second clock and wherein the test unit is operable for sequentially decreasing the delay value if a value of the second data signal corresponds to the first data value.

10. The apparatus of claim 9 further comprising a first buffer an input operable for receiving said first data signal; and
    a second buffer having an input coupled to an output of the first buffer and an output for outputting the second data signal, wherein the output of the second buffer is coupled to an input of the fist buffer.

11. The apparatus of claim 9 wherein the first clock is provided by the test unit.

12. The apparatus of claim 9 wherein the apparatus outputs the second data signal when the value of the second data signal corresponds to the first data value.

* * * * *

UNITED STATES PATENT AND TRADEMARK OFFICE
CERTIFICATE OF CORRECTION

PATENT NO. : 6,449,738 B1
DATED : September 10, 2002
INVENTOR(S) : Fahd Hinedi, James Nolan Hardage, Jr. and Lakshmikant Mamileti It is certified that error appears in the above-identified patent and that said Letters Patent is hereby corrected as shown below:

<u>Column 6,</u>
Line 8, please replace "no t" with -- not --.

Signed and Sealed this

Fourth Day of March, 2003

JAMES E. ROGAN
*Director of the United States Patent and Trademark Office*